July 23, 1957

N. V. SHERRICK, JR 2,800,358

WAGON OR TRUCK BODY

Filed May 4, 1956

INVENTOR.
NOAH V. SHERRICK JR.
BY
McMorrow, Berman & Davidson
ATTORNEYS

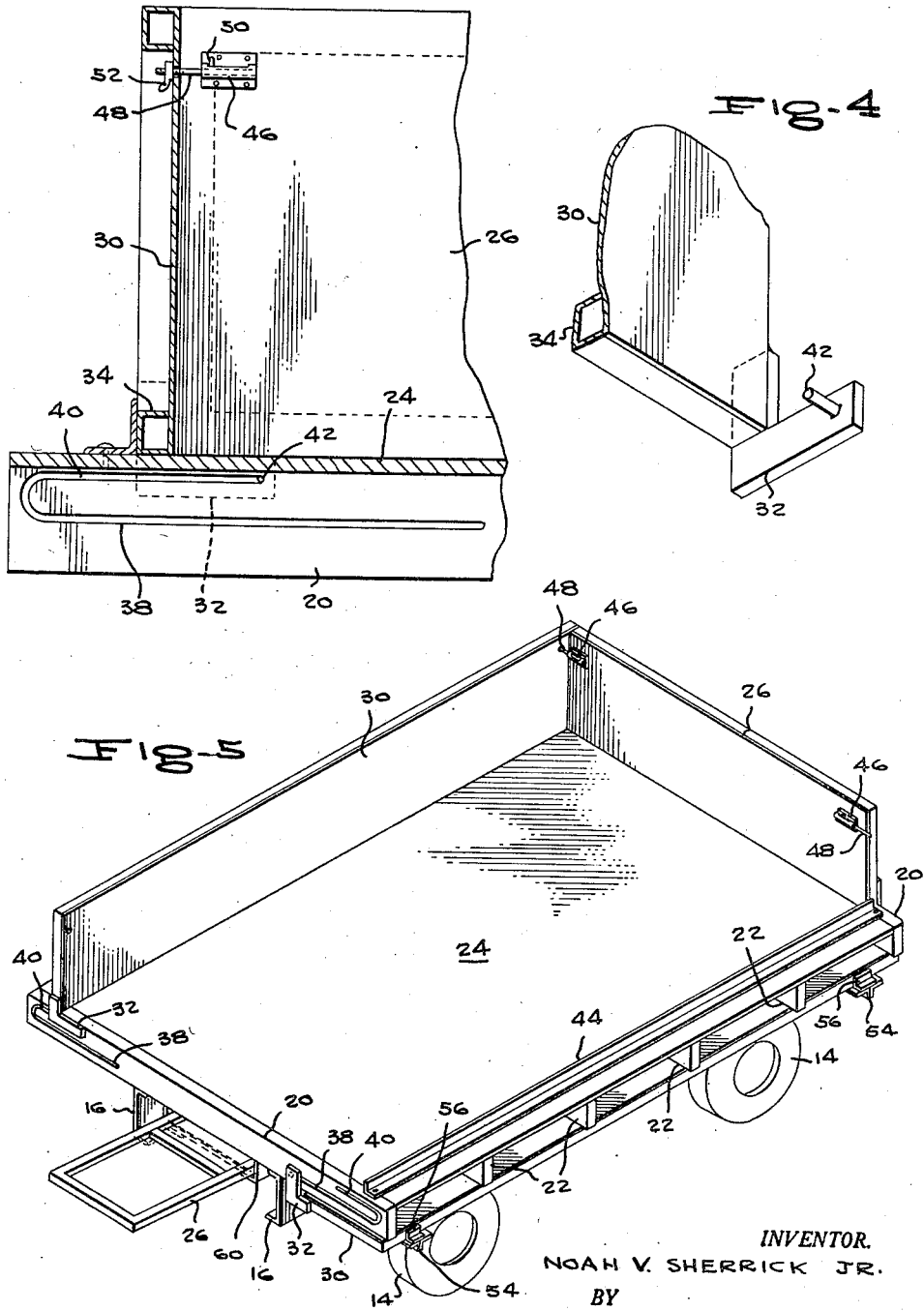

United States Patent Office 2,800,358
Patented July 23, 1957

2,800,358

WAGON OR TRUCK BODY

Noah V. Sherrick, Jr., Lima, Ohio

Application May 4, 1956, Serial No. 582,712

8 Claims. (Cl. 296—14)

This invention relates to wagon or truck bodies, and more particularly has reference to a construction for facilitating the removal and storage of the end gates and side boards, thus to permit swift conversion of the body from a flat bed structure having no side or end walls to a walled body, and vice versa.

Summarized briefly, the invention includes a flat bed or platform, having removable end gates, which, when detached, may conveniently be stored in a frame depending from the underside of the platform. The invention further includes side boards, pivotally supported upon the structure in such a manner that they may be swung between vertical use positions and collapsed positions in which they are stored under the platform. The side boards have their hinge pins extending within elongated, horizontally disposed, J-shaped slots, and provided upon the side boards are angular brackets on which the hinge pins are maintained. The arrangement is such that the side boards are initially moved from their use positions outwardly, and then after being swung to lower positions, are shifted inwardly along the long legs of the slots to come to rest, ultimately, upon supports provided below the platform.

Important objects of the invention, among others, are to permit swift conversion of the wagon body without the use of special tools or the like; facilitate storage of the end gates and side boards; locate the end gates and side boards when they are stored, in areas in which they will be completely out of the way; and provide novel means for interlocking the end gates and side boards when they are extended ready for use.

Other objects will appear from the following description, the claims appended thereto, and from the annexed drawing, in which like reference characters designate like parts throughout the several views, and wherein:

Figure 1 is a side elevational view of the wagon body with the side boards in extended position, portions being broken away;

Figure 2 is an end elevational view as seen from the left of Figure 1;

Figure 3 is an enlarged section on line 3—3 of Figure 1;

Figure 4 is a fragmentary perspective view on an enlarged scale, showing one end of a side board; and Figure 5 is a perspective view of the wagon body, with one side board raised and another stored, one of the end gates being shown partially inserted in its holder.

Although the invention is usable both on wagon and truck bodies, a wagon body is shown by way of example, and includes the transversely extending cross bars 10, having bearing sleeves 12 at their ends (Figure 2) receiving stub axles of wheels 14.

Supported upon bars 10 and extending longitudinally of the body are channeled frame members 16, defining with bars 10 a vertical frame generally designated 17. A tongue 18 is connected to the forward cross bar 10, for hitching the vehicle to a traction vehicle.

Fixedly secured to and supported upon the vertical frame is a bed generally designated 19, including a plurality of cross bars extending transversely of and fixedly secured to frame members 16. The cross bars are spaced longitudinally of the vehicle frame, and include end cross bars 20 and a plurality of intermediate cross bars 22. Supported upon and affixed to the cross bars is a rectangular load support platform 24 in a horizontal plane.

The invention includes removable end gates 26, which in use are in vertical planes, extending upwardly from the opposite ends of platform 24.

The manner of maintaining the end gates in their use positions will be discussed in greater detail hereinafter.

The invention further includes side boards 30, extending the length of the platform, between the end gates. The side boards, at opposite ends thereof, have angular brackets, 32, said brackets each being in the shape of a right angle with one leg fixedly secured to the adjacent lower corner of the side board and the other leg extending perpendicularly to the plane of the side board.

To reinforce the side boards, they are provided with roller longitudinal edges 34, and cross bracing the side boards are brace members 36.

In the end cross bar 20, there are formed J-shaped slots 38. Reference is here made to Figure 2. Each end cross bar 20 has a pair of the slots 38, oppositely disposed and formed in the end portions of the cross bar. Each of the J-shaped slots has a longer, lower leg extending substantially longitudinally and centrally of the associated cross bar 20, and a shorter upper leg extending parallel to and above the longer leg. The legs are connected by a short bight portion curving through approximately 180 degrees and spaced closely from the adjacent end of the cross bar.

For readier identity of the portions of the slot, the shorter legs have been designated at 40 and the longer legs at 41.

Projecting inwardly from the free ends of the brackets 32 are hinge pins 42, coaxially aligned in parallel relation to the plane of the associated side board. Pins 42 are permanently engaged in the adjacent slot 38, and when the side boards are vertically disposed in use positions abut against the inner ends of the shorter legs 40 of the slots.

To hold the side boards in their use positions, there are provided elongated stops 44 extending the full length of the side boards as shown in Figure 1 and fixedly secured to the several cross bars 20, 22. The stops are preferably of angle iron material, and engage against the outer surfaces of the side boards when the side boards are in use.

One may, therefore when adjusting a side board from its use to its stored positions, first lift upwardly on the side board to locate the same in the dotted position A of Figure 2. This clears the stop 44, and the side board is now shifted outwardly until it reaches the bight portion of the slot. Then, pins 42 travel through the bight portions, with the side boards swinging through the dotted line position B of Figure 2 until it lies in a horizontal plane as shown by the dotted position C. At this time, the pins are at the inner ends of the longer legs 41, with the free ends of the brackets now projecting upwardly rather than laterally of the side board.

When the side boards are in use, they are bolted at their ends to the end gates. To this end, there are provided keepers 46, in which are axially shiftable bolts 48 that may be projected outwardly through openings formed in the side boards, to receive wing nuts or similar elements 52.

It will thus be seen that the end boards are anchored to the side boards when in use, and it will be understood that if desired, the boards may be kept from swinging about the axis of the bolts 48 by a suitable stop provided upon the adjacent end of the platform.

For the purpose of supporting the side boards in their stored positions C, support arms 54 are projected outwardly from and are fixedly secured at their inner ends to the respective frame members 16. The arms are horizontally disposed, and any number of them may be employed, according to the length of the side board to be supported. To insure against accidental movement of the side board outwardly from its stored position, stops 56 are secured to the outer ends of the arms 54 and engage the side boards against undesired outward movement. The stops 56 are relatively low in height, so as to be readily cleared by the side boards during movement into and out of their stored positions.

To brace the arms 54 there are provided inclined brace arms 58 fixedly connected between arms 54 and frame members 16.

Means is also provided for storage of the end gates, and comprises a pair of elongated support members 60 extending longitudinally of and below the platform, inwardly from the members 16. Support members 60 have inwardly directed longitudinal flanges 62, on which the end gates may be slid into their stored positions.

It will be seen that the construction permits the swift adjustment of the side boards between their use and stored positions, and further permits the side boards to be permanently maintained upon the vehicle while still assuring that they will be in an out-of-the-way position when not in use. Further, the end gates can also be swiftly removed or mounted for use, whichever is desired, and when removed are also stored out of the way, for use of the vehicle as a flat bed structure having no side and end walls.

Of course, the side boards can be erected without requiring the mounting of the end gates, should it be desired to haul objects longer than the wagon or truck body, since the end gates are kept in their vertical positions by the cooperating action of the stops 44 and hinge pins 42, that is, these components prevent the end gates from swinging outwardly from their use positions.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A body for wagons, trucks, and like vehicles including a flat bed having a transversely extending crossbar at each end, each of the crossbars having a slot at each end; side boards extending longitudinally of the bed and including hinge pins engaged in the slots, said slots being formed with spaced legs connected by a bight portion and the pins being slidable within the slots from one to the other legs thereof, for adjustment of the side boards between use positions in which the pins are disposed at one end of the slots and stored positions in which the pins are engaged in the opposite ends of the slots, said side boards in their stored positions being horizontally disposed below the bed; and means below the bed supporting the side boards in the stored positions thereof.

2. A body for wagons, trucks, and like vehicles including a flat bed having a transversely extending crossbar at each end, each of the crossbars having a slot at each end; side boards extending longitudinally of the bed and including hinge pins engaged in the slots, said slots being formed with spaced legs connected by a bight portion and the pins being slidable within the slot from one to the other legs thereof, for adjustment of the side boards between use positions in which the pins are disposed at one end of the slots and stored positions in which the pins are engaged in the opposite ends of the slots, said side boards in their stored positions being horizontally disposed below the bed; and means below the bed supporting the side boards in the stored positions thereof, comprising arms projecting outwardly of the bed and spaced longitudinally of the side boards, the side boards in their stored positions overlying the arms.

3. A body for wagons, trucks, and like vehicles including a flat bed having a transversely extending crossbar at each end, each of the crossbars having a slot at each end; side boards extending longitudinally of the bed and including hinge pins engaged in the slots, said slots being formed with spaced legs connected by a bight portion and the pins being slidable within the slots from one to the other legs theerof, for adjustment of the side boards between use positions in which the pins are disposed at one end of the slots and stored positions in which the pins are engaged in the oposite ends of the slots, said side boards in their stored positions being horizontally disposed below the bed; and means below the bed supporting the side boards in the stored positions thereof, comprising arms projecting outwardly of the bed and spaced longitudinally of the side boards, the side boards in their stored positions overlying the arms, and stops on the outer ends of the arms engaging the side boards against movement from their stored positions in a direction laterally outwardly of the vehicle body.

4. In a body for wagons, trucks, and the like, a flat bed, said bed including two end crossbars and a plurality of crossbars intermediate said end crossbars, said crossbars lying in vertical planes and a platform supported upon the cross bars in a horizontal plane, each of the two end crossbars being formed with J-shaped slots adjacent each end thereof, each of the slots having the longer leg below and extending substantially longitudinally and centrally of the associated cross bar and the shorter leg above and extending parallel to the longer leg with the bight contiguous to the adjacent end of said associated crossbar; and side boards mounted upon said cross bars, the side boards including angular brackets at their ends and hinge pins projecting from the free ends of the brackets and engaged in the shorter legs of the respective slots in vertical use positions of the side boards and slidably and rotatably engaged along the shorter leg through the bight and into and along the longer leg of the resepctive slots to horizontal stored positions of the side boards, along the lengths of the longer legs of the respective slots.

5. In a body for wagons, trucks, and the like, a flat bed, said bed including two end crossbars and a plurality of crossbars intermediate said end crossbars, said crossbars lying in vertical planes and a platforms supported upon the cross bars in a horizontal plane, each of the two end crossbars being formed with J-shaped slots adjacent each end thereof, each of the slots having the longer leg below and extending substantially longitudinally and centrally of the associated crossbar and the shorter leg above and extending parallel to the longer leg with the bight contiguous to the adjacent end of said associated crossbar; side boards mounted upon said cross bars, the side boards including angular brackets at their ends and hinge pins projecting from the free ends of the brackets and engaged in the shorter legs of the slots in vertical use positions of the side boards and slidably and rotatably engaged along the shorter legs through the bights and into and along the longer legs of the respective slots to horizontal stored positions of the side boards, along the lengths of the longer legs of the slots; and elongated stop means mounted upon the cross bars in position to abut against the side boards in the use positions of the side boards.

6. In a body for wagons, trucks, and the like, a flat bed, said bed including two end crossbars and a plurality of crossbars intermediate said end crossbars, said crossbars lying in vertical planes and a platform supported upon the cross bars in a horizontal plane, each of the two end crossbars being formed with J-shaped slots adjacent each end thereof, each of the slots having the longer leg below and extending substantially longitudinally and centrally of the associated crossbar and the shorter leg above and extending parallel to the longer leg with the bight contiguous to the adjacent end of said associated crossbar; side boards mounted upon said cross bars, the side boards including angular brackets at their ends and hinge pins projecting from the free ends of the brackets and engaged in the shorter legs of the respective slots in vertical use positions of the side boards and slidably and rotatably engaged along the shorter legs through the bights and into and along the longer legs of the respective slots to horizontal stored positions of the side boards, along the lengths of the longer legs of the slots; and elongated stop means mounted upon the cross bars in position to abut against the side boards in the use positions of the side boards; end gates removably mounted upon the platform at opposite ends thereof; and means for releasably connecting the side boards and end gates in the use positions of the side boards.

7. In a body for wagons, trucks, and the like, a flat bed, said bed including two end crossbars and a plurality of crossbars intermediate said end crossbars, said crossbars lying in vertical planes and a platform supported upon the cross bars in a horizontal plane, each of the two end crossbars being formed with J-shaped slots adjacent each end thereof, each of the slots having the longer leg below and extending substantially longitudinally and centrally of the associated crossbar and the shorter leg above and extending parallel to the longer leg with the bight contiguous to the adjacent end of the associated crossbar; side boards mounted upon said cross bars, the side boards including angular brackets at their ends and hinge pins projecting from the free ends of the brackets and engaged in the shorter legs of the respective slots in vertical use positions of the side boards and slidably and rotatably engaged along the shorter legs through the bights and into and along the longer legs of the respective slots to horizontal stored positions of the side boards, along the lengths of the longer legs of the slots; and elongated stop means mounted upon the cross bars in position to abut against the side boards in the use positions of the side boards; end gates removably mounted upon the platform at opposite ends thereof; and means for releasably connecting the side boards and end gates in the use positions of the side boards, comprising keepers mounted upon the respective end gates, bolts axially shiftable in the keepers, the side boards having openings receiving the bolts on shifting of the bolts outwardly of the keepers, and nuts threaded upon the bolts and adapted to bear against the side boards to hold the side boards connected to the end gates.

8. In a body for wagons, trucks, and the like, a flat bed, said bed including two end crossbars and a plurality of crossbars intermediate said end crossbars, said crossbars lying in vertical planes and a platform supported upon the cross bars in a horizontal plane, each of the two end crossbars being formed with J-shaped slots adjacent each end thereof, each of the slots having the longer leg below and extending substantially longitudinally and centrally of the associated crossbar and the shorter leg above and extending parallel to the longer leg with the bight contiguous to the adjacent end of said associated crossbar; side boards mounted upon said cross bars, the side boards including angular brackets at their ends and hinge pins projecting from the free ends of the brackets and engaged in the shorter legs of the respective slots in vertical use positions of the side boards and slidably and rotatably engaged along the shorter legs through the bights and into and along the longer legs of the respective slots to horizontal stored positions of the side boards, along the lengths of the longer legs of the slots; and elongated stop means mounted upon the cross bars in position to abut against the side boards in the use positions of the side boards; end gates removably mounted upon the platform at opposite ends thereof; means for releasably connecting the side boards and end gates in the use positions of the side boards, comprising keepers mounted upon the respective end gates, bolts axially shiftable in the keepers, the side boards having openings receiving the bolts on shifting of the bolts outwardly of the keepers, and nuts threaded upon the bolts and adapted to bear against the side boards to hold the side boards connected to the end gates; and means secured to the undersides of the cross bars and extending longitudinally of the bed providing a housing for storage of the end gates, on removal of the end gates.

References Cited in the file of this patent
UNITED STATES PATENTS

| | | |
|---|---|---|
| 782,165 | McElvan | Feb. 7, 1905 |
| 1,228,117 | Kennel | May 29, 1917 |
| 1,830,785 | Elmer | Nov. 10, 1931 |
| 2,480,965 | Renke et al. | Sept. 6, 1949 |